US005566081A

United States Patent [19]
Yoshizawa et al.

[11] Patent Number: 5,566,081
[45] Date of Patent: Oct. 15, 1996

[54] METHOD OF SAVING POWER CONSUMPTION IN A BATTERY OPERATED PAGER RECEIVER

[75] Inventors: Shigeo Yoshizawa, Tokyo; Kuniaki Koga, Shizuoka, both of Japan

[73] Assignee: NEC Corporation, Japan

[21] Appl. No.: 142,273

[22] Filed: Oct. 25, 1993

[30]  Foreign Application Priority Data

Oct. 23, 1992 [JP] Japan ................................ 4-285667

[51] Int. Cl.⁶ .............................. H04B 5/04; H04Q 9/14
[52] U.S. Cl. ................ 364/492; 364/707; 340/825.44; 340/825.63; 455/38.2; 455/38.3; 455/343
[58] Field of Search .................................. 364/480, 483, 364/707, 492; 395/750, 550; 340/825.44, 825.57, 825.62, 825.63; 341/178, 182; 455/38.1, 38.2, 38.3, 343; 375/22, 23, 95, 238, 239, 342; 365/ 226, 227, 228, 229

[56]  References Cited

U.S. PATENT DOCUMENTS

| | | | |
|---|---|---|---|
| 4,398,192 | 8/1983 | Moore et al. | 340/825.44 |
| 4,479,261 | 10/1984 | Oda et al. | 340/825.44 |
| 4,506,386 | 3/1985 | Ichikawa et al. | 455/38.3 |
| 4,523,332 | 6/1985 | Mori | 340/825.44 |
| 4,745,408 | 5/1988 | Nagata et al. | 340/825.44 |
| 4,839,639 | 6/1989 | Sato et al. | 340/825.44 |
| 5,021,679 | 6/1991 | Fairbanks et al. | 364/707 |
| 5,140,702 | 8/1992 | Laflin | 340/825.44 |
| 5,152,006 | 9/1992 | Klaus | 340/825.44 |
| 5,155,479 | 10/1992 | Ragan | 340/825.44 |
| 5,187,471 | 2/1993 | Wagai et al. | 340/825.44 |
| 5,251,325 | 10/1993 | Davis et al. | 455/38.3 |
| 5,252,963 | 10/1993 | Snowden et al. | 340/825.44 |
| 5,355,518 | 10/1994 | Kindinger et al. | 455/38.3 |
| 5,375,245 | 12/1994 | Solhjell et al. | 364/707 |
| 5,392,457 | 2/1995 | Davis et al. | 455/38.3 |
| 5,428,638 | 6/1995 | Cioffi et al. | 455/38.3 |
| 5,490,286 | 2/1996 | Kah, Jr. | 455/38.3 |

*Primary Examiner*—Emanuel T. Voeltz
*Assistant Examiner*—Eric W. Stamber
*Attorney, Agent, or Firm*—Whitham, Curtis, Whitham & McGinn

[57]  ABSTRACT

In order to effectively reduce power consumption of a radio pager, an originally determined time period for which power is supplied to high power drain circuitry, is narrowed in the case where the interval between two adjacent code signals transmitted from a calling station becomes more than a predetermined time duration. Contrarily, if the above-mentioned interval is less than the predetermined time duration, the narrowed time period is changed to the original one.

5 Claims, 3 Drawing Sheets

METHOD OF SAVING POWER CONSUMPTION IN A BATTERY OPERATED PAGER RECEIVER

BACKGROUND OF THE INVENTION

1. Field of the Invention

The present invention relates generally to a method of effectively reducing power consumption of a battery operated radio pager, and more specifically to such a method wherein a time duration for which high power drain circuitry is energized, is controlled depending on a traffic density of code signals which are transmitted from a calling station.

2. Description of Related Art

Radio paging systems have proven very popular and many efforts have been made to reduce their size, weight, and power consumption through the use of integrated circuit techniques.

In connection with power conservation, a battery saving method is utilized to minimize power consumption by periodically supplying power to high power drain circuitry in short bursts instead of continuously.

A presently known battery saving method used in a radio pager, periodically supplies power to a front end (viz., a high frequency receiver section) in order to intermittently enable the search for the presence of a preamble code. If the preamble is detected, the front end is further energized for identifying a subscriber's identification (ID). In the case where the subscriber's ID is ascertained, the subsequently transmitted information is acquired.

The above-mentioned prior art will further be explained with reference to FIG. 1.

FIG. 1 shows, at Section A thereof, a plurality of code signals (each denoted by TX) transmitted from a calling station (not shown). FIG. 1 further shows, at Section B thereof, a standard code format of the code signal TX. This code format is proposed by POCSAG (British Post Office Code Standardization Advisory Group). Although the present invention is not limited to such a code format, it is believed that a brief description thereof will facilitate an understanding of the instant invention.

According to the POCSAG specification, a transmission consists a preamble followed by batches 1, 2, ..., N, each batch beginning with a synchronization codeword (SC) as shown in Section B of FIG. 1.

The transmission ceases when there are no further calls. Each transmission starts with a preamble to permit the recipient pager to attain bit synchronization and to prepare to acquire word synchronization. The preamble is a pattern of reversals, 101010..., repeated for a period of at least 576 bits. A bit rate per second is 512 (for example) in the case of which the time duration of the preamble (denoted by Tp) is about 1.125 seconds. As shown in Section B of FIG. 1, message codewords are transmitted in batches each of which comprises an SC (32 bits) followed by eight (8) frames (each 64 bits). Accordingly, one batch amounts to 544 (=32+(8× 64)) bits.

Section C of FIG. 1 shows a plurality of preamble search pulses PS each having a time period (viz., pulse width) T1 which represents the time duration for which power is supplied to high power drain circuitry such as the front end of the pager. During this time period T1, the pager is rendered operative and is permitted to search for the preambles. The time period T1 is followed by a battery saving time period Tbs for which power is not supplied to the high power drain circuitry but to low power drain circuits. The period of the pulses PS is denoted by Ta (=T1+Tbs).

When the pager detects a preamble, it further searches for the synchronization codeword SC. If the pager ascertains the codeword SC and is synchronized thereby, an address included in the first batch 1 (for example) is compared with a subscriber's unique code (UC) which is previously stored in the pager. If the address coincides with the subscriber's unique code, then the subsequent messages are acquired. The above-mentioned address and messages are included in a predetermined frame of each of the batches and acquired by a plurality of information search pulses IS. The information of the frames which are assigned to the subscriber's pager has previously been stored in a ROM (Random Access Memory) in the pager.

The period Ta of the preamble search pulses PS is chosen to be shorter than the time duration Tp of the preamble so that each of the repetitive pulses PS must occur within the duration Tp.

Further, in order to specify the presence of a preamble without failure, the pulse width T1 is set to a relatively large value (80 ms for example). Therefore, in the case where the interval between the adjacent code signals transmitted from the calling station is rendered considerably long during night (for example), the battery saving efficiency is undesirably lowered due to the above-mentioned long time duration T1.

The above-mentioned prior art has not addressed such a problem. Accordingly, it is highly desirable to narrow the pulse width T1 to a value which may not adversely affect the definition of each of the preambles in the case of low traffic density.

SUMMARY OF THE INVENTION

It is an object of the present invention to provide a method of effectively reducing power consumption of a radio pager by narrowing a pulse width of each of the preamble search pulses when the interval between the transmitted code signals is larger than a predetermined time duration.

In brief, the above object is achieved by a method wherein in order to effectively reduce power consumption of a radio pager, an originally determined time period for which power is supplied to high power drain circuitry, is narrowed if the interval between two adjacent code signals transmitted falls below a predetermined time duration. Contrarily, if the above-mentioned interval exceeds the predetermined time duration, the narrowed time period is changed to the original one.

An aspect of the present invention resides in a method of reducing power consumption of a battery operated radio pager, comprising the steps of: (a) periodically generating a plurality of pulses each having a first time period for which power is supplied to high power drain circuity of the pager in order to permit the pager to be rendered operative for searching for preambles which are transmitted from a calling station; (b) measuring a time elapsed after a given preamble is detected; (c) searching for preambles by periodically generating the pulses each having the first time period if the time elapsed is less than a predetermined time duration; and (d) changing the first time period to a second time period which is shorter than the first time period by a predetermined amount if the time elapsed exceeds the predetermined time duration, and searching for preambles by generating a plurality of the pulses each having the second time period.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Figure 2:
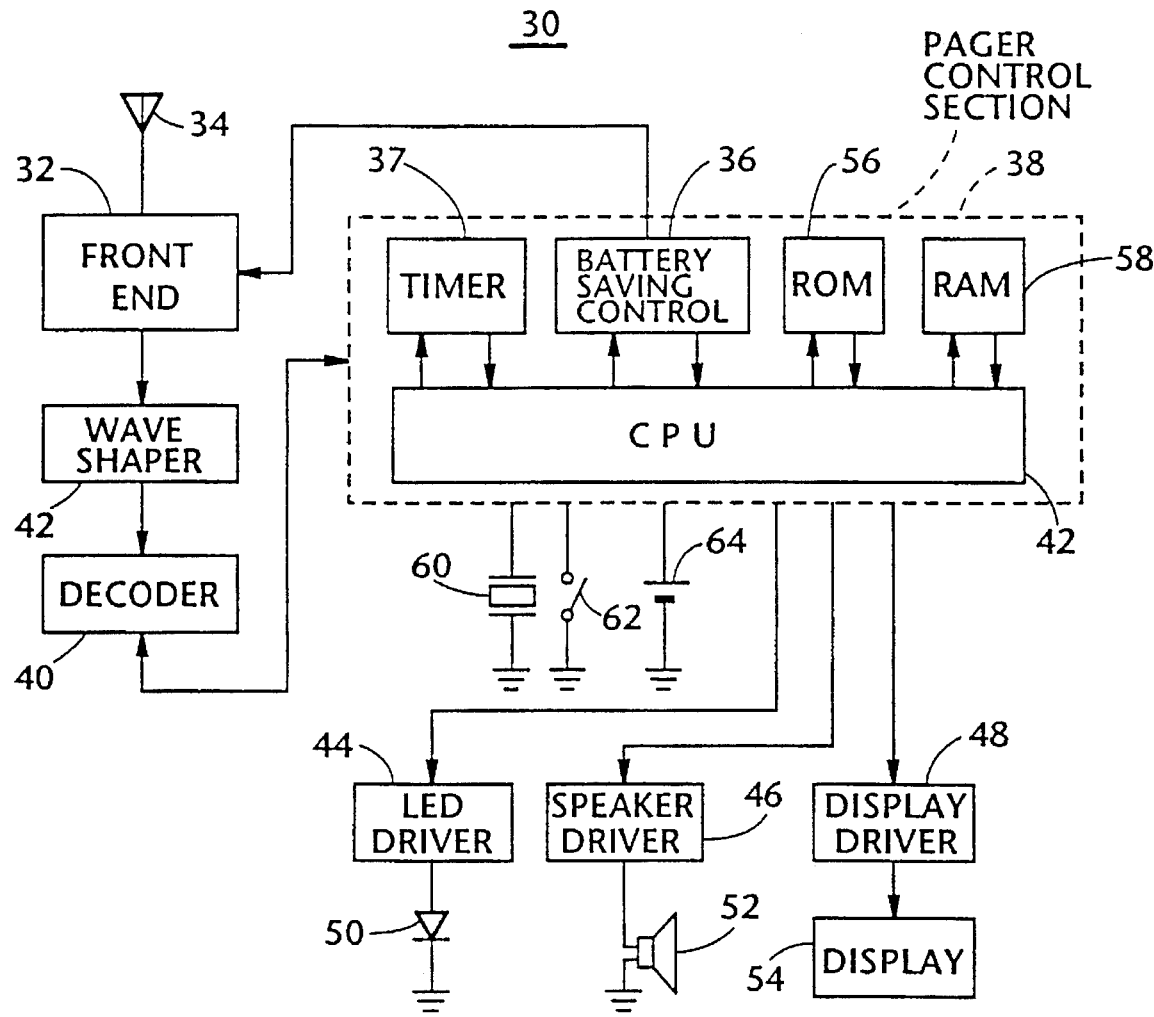
FIG. 2 is a block diagram showing an arrangement of a radio pager to which the present invention is applicable.

FIG. 2 shows schematically an arrangement of a pager 30 to which the present invention is applicable.

As shown, a front end 32 is provided for amplifying and demodulating a code-modulated carrier wave received by an antenna 34. The front end 32 is a conventional circuit arrangement comprised of a high frequency amplifier, a frequency converter, an IF (Intermediate Frequency) amplifier, and a discriminator. The front end 32 is periodically energized by a plurality of preamble search pulses which are applied from a battery saving controller 36 forming part of a pager control section 38. The controller 36 controls the battery saving using a timer 37 as mentioned later.

It is assumed that the front end 32 acquires one of the preambles sequentially transmitted from a calling station (not shown). The output of the front end 32 is applied to a decoder 40 after being wave-shaped at a wave shaper 42. The decoder 40 searches for a preamble and a synchronization codeword SC preceded thereby. If the codeword SC is detected, the decoder 40 searches for an identifying address code by comparing the same with a subscriber's unique code prestored in a PROM (Programmable Read Only Memory) within the decoder 40 (not shown in FIG. 2).

In the event that the identifying address code coincides with the subscriber's unique code, the decoder 40 activates the control section 38 and then applies message data included in the following batches to the control section 38. When the control section 38 acquires the message data, a CPU (Central Processing Unit) 42 enables a LED (Light Emitting Diode) driver 44, a speaker driver 46, and a display driver 48. Thus, both of a light source (viz., LED) 50 and a speaker 52 are energized for alerting the subscriber. Further, the message directed to the subscriber is demonstrated on a display 54.

A ROM 56 is provided for storing a program which controls the overall operations of the pager 30, while a RAM (Random Access Memory) 58 is used to define a work space needed for pager operations. Further, the control section 38 is operatively coupled to an oscillator 60, a pager power switch 62, and a battery 64.

Figure 1:
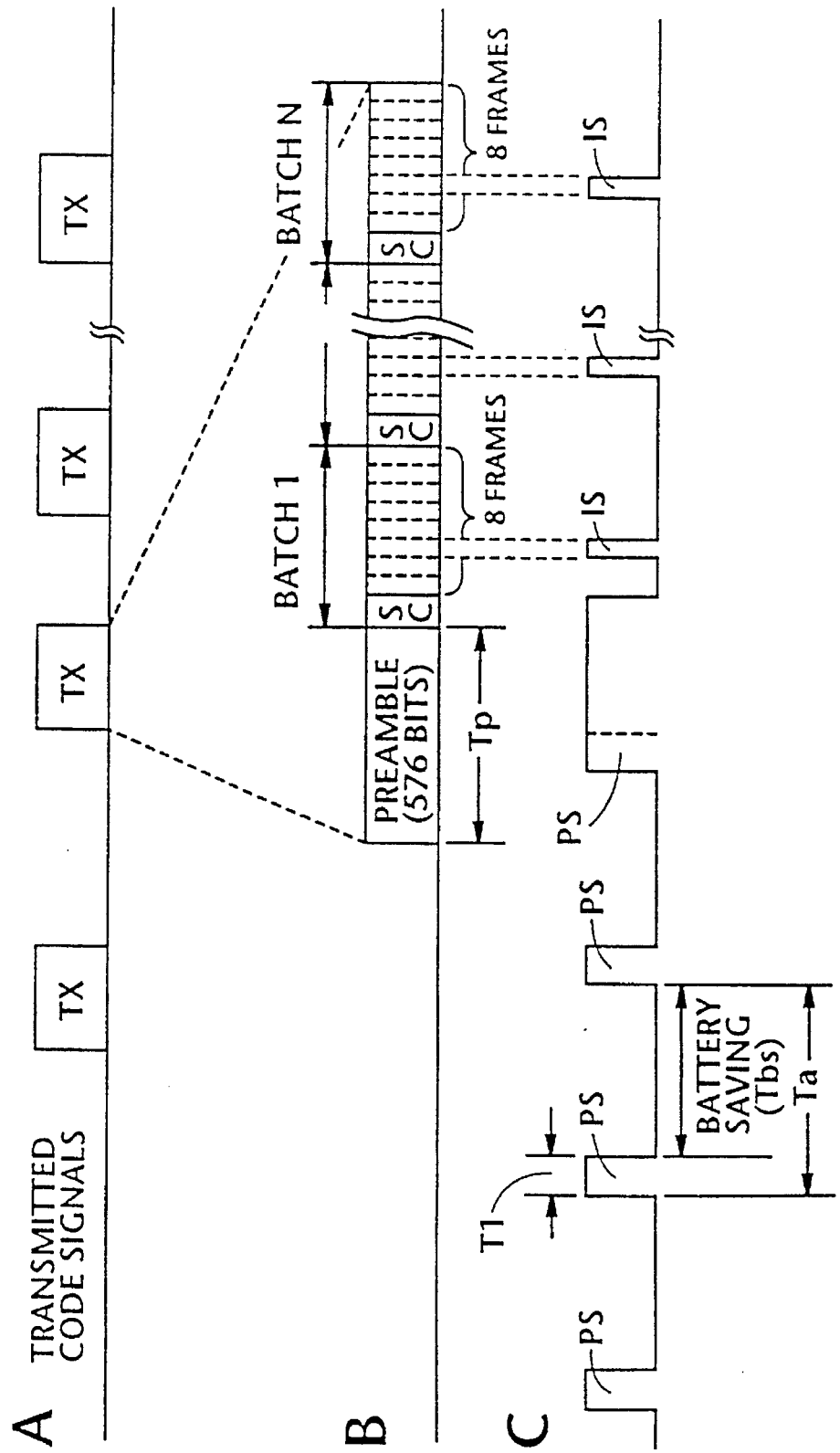
FIG. 1 is a schematic diagram which illustrates the preamble search according to a known method, referred to in the opening paragraphs of the instant disclosure.
Figure 3:
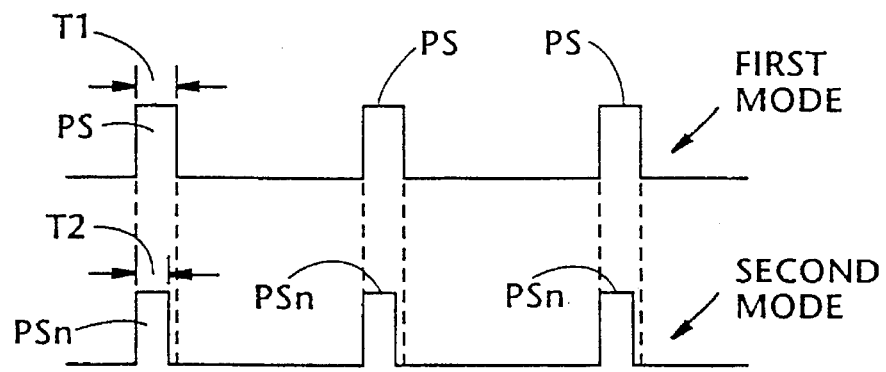
FIG. 3 is a diagram which shows two kinds of preamble search pulses according to the present invention.

FIG. 3 shows two kinds of preamble search pulses PS and PSn illustrated at upper and lower portions of the drawing, respectively. The pulses PS are identical to those shown in FIG. 1 and applied to the front end 32 from the battery saving controller 36 (FIG. 2) during a first mode. On the other hand, the other preamble search pulses PSn are applied to the front end 32 while the battery saving operation enters into a second mode.

In the event that the interval between two adjacent code signals transmitted from the calling station exceeds a predetermined time duration, the battery saving is changed from the first mode to the second mode. Contrarily, if the above-mentioned interval becomes less than the predetermined time duration, the battery saving is switched over to the original mode (viz., first mode).

As mentioned above, the time period T1 of the pulse PS is rendered sufficiently long in order to ensure that the presence of the preamble can be detected without exception. In other words, the time period T1 is determined from the safety point of view and thus undesirably long. Accordingly, if the pulses PS are generated all day long, the battery saving efficiency is undesirably lowered in the case of low traffic density during night.

According to the present invention, the time duration T1 is narrowed to T2 if the interval between the adjacent code signals transmitted from the calling station is found to be larger than the predetermined time period. It goes without saying that the time period T2 should be determined such as to ensure the definition of the preambles. Merely by way of example, the time period T2 is set to about 50 ms.

Figure 4:
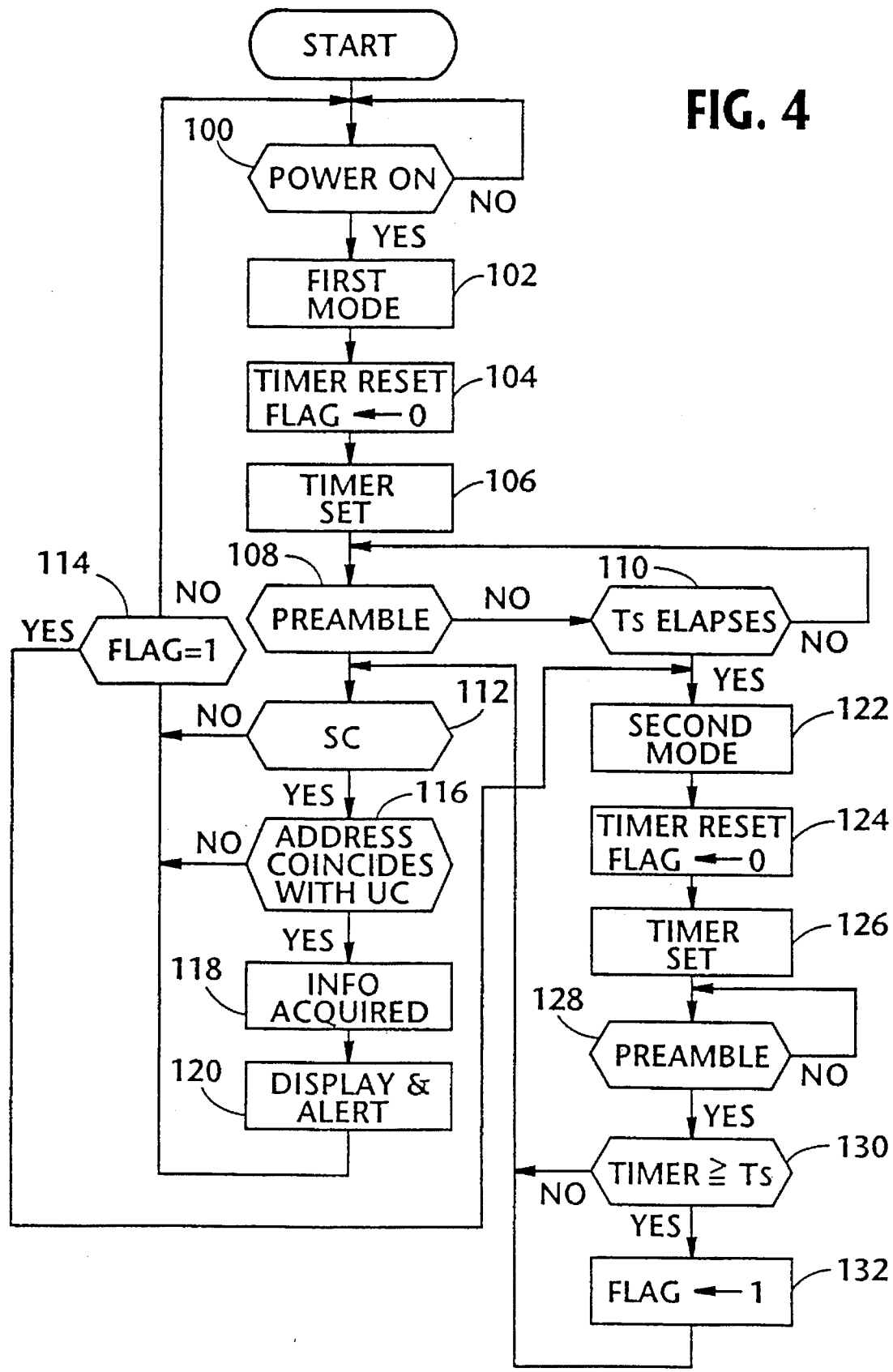
FIG. 4 is a flow chart which shows the steps which characterize the operations of the present invention.

FIG. 4 is a flow chart which shows the steps which characterize the operations of the instant invention.

The battery saving operations according to the instant invention will be described with reference to FIGS. 2–4.

The first step (step 100) of the routine illustrated in FIG. 4, comprises the pager 30 being turned on by the power switch 64 (FIG. 2). It should be noted that even if the power switch 64 remains open, the CPU 42 is constantly energized in order to hold data stored in the RAM 58 and to keep a clock operative and so on.

When the switch 64 is turned on, the battery saving controller 36 (or pager 30) enters into the first mode under the control of the CPU 42 (step 102). During the first mode, the controller 36 issues a plurality of pulses PS which are applied to the front end 32. The first mode is identical to the conventional mode as discussed in the opening paragraphs of the instant disclosure.

When the battery saving enters into the first mode, the timer 37 is reset and immediately thereafter rendered operative (steps 104 and 106). Further, a logic "0" is stored in a flag at step 104. Following this, the pager 30 searches for a preamble. If the pager 30 fails to detect the presence of a preamble (step 108), the routine goes to step 110 wherein the elapsed time counted at the timer 37 is checked to see if the elapsed time exceeds a predetermined time Ts (10 seconds for example).

In the event that the pager 30 detects a given preamble before the timer 37 counts up the predetermined time Ts, the program goes to step 112 wherein the decoder 40 searches for the synchronization codeword SC to be preceded by the preamble. In the case where the pager 30 fails to ascertain the codeword SC (step 112), the flag is checked to see if it contains a logic 1 (step 114). In this instance, the flag stores a logic 0 and hence the routine goes back to step 100. If the answer at step 112 is affirmative, the address transmitted is checked to see if it coincides with the subscriber's unique code UC at step 116. If the answer is negative at step 116, the program returns to step 100 by way of step 114. By contrast, if the address transmitted coincides with the unique code UC at step 116, the pager 30 acquires the message which follows the address code (step 118). The subscriber is alerted and the message are exhibited on the display 54 (step 120). Subsequently, the routine returns to step 100 via step 114 in this particular case.

On the other hand, if the elapsed time after the setting of the timer 37 exceeds the predetermined time Ts (step 110), the routine goes to step 122 wherein the battery saving mode (viz., first mode) is changed to the second mode (step 122).

During the second mode, the controller 36 issues a plurality of pulses PSn which are applied to the front end 32 as in the case of the first mode. Further, the timer 37 is reset and immediately thereafter rendered operative (steps 124 and 126). Following this, the pager 30 searches for a preamble until detecting same (step 128). If a preamble is detected at step 128, the routine proceeds to step 130 wherein the elapsed time at the timer 37 is checked to see if it exceeds the predetermined time Ts (step 130).

In the case where the answer is affirmative at step 130, a logic 1 is set to the flag. Subsequently, the program goes to step 112 after which the above-mentioned processes are repeated. However, a logic 1 has been set to the flag in this instance and hence the routine goes back to step 122 from step 114.

On the other hand, if the answer is negative at step 130, the program goes to step 112 while the flag remains holding a logic 0. In this case, the program returns to step 100 via one or more of steps 112, 116, 118 and 120. Thus, the battery saving returns to the first mode.

It will be understood that the above disclosure is representative of only one possible embodiment and that various modifications can be made without departing from the concept of the instant invention.

What is claimed is:

1. A method of reducing power consumption of a battery-operated radio pager, comprising steps of:

periodically generating a plurality of pulses each having a first pulse width for which power is supplied to a circuit of said pager in order to permit said pager to be rendered operative for searching for preambles which are transmitted from a calling station;

measuring a time interval between adjacent preambles;

searching for preambles by periodically generating said pulses each having said first pulse width if said time interval is less than a predetermined time duration; and changing said first pulse width to a second pulse width which is shorter than said first pulse width by a predetermined amount if said time interval exceeds said predetermined time duration, and searching for preambles by generating a plurality of said pulses each having said second pulse width.

2. A method as claimed in claim 1, further comprising a step of:

changing said second pulse width to said first pulse width if said time interval falls below said predetermined time duration.

3. An apparatus for reducing power consumption of a battery-operated radio pager, comprising:

a circuit;

means for periodically generating a plurality of pulses each having a first pulse width for which power is supplied to said circuit of said pager in order to permit said pager to be rendered operative for searching for preambles which are transmitted from a calling station;

means for measuring a time interval between adjacent preambles;

means for searching for preambles by periodically generating said pulses each having said first pulse width if said time interval is less than a predetermined time duration;

means for changing said first pulse width to a second pulse width which is shorter than said first pulse width by a predetermined amount if said time interval exceeds said predetermined time duration, and searching for preambles by generating a plurality of said pulses each having said second pulse width; and means for changing said second pulse width to said first pulse width if said time interval falls below said predetermined time duration.

4. A method according to claim 2, wherein said circuit comprises electric-powered circuitry.

5. An apparatus according to claim 3, wherein said circuit comprises electric-powered circuitry.

* * * * *